(12) United States Patent
Naito

(10) Patent No.: US 9,396,881 B2
(45) Date of Patent: Jul. 19, 2016

(54) SOLID ELECTROLYTIC CAPACITOR

(71) Applicant: SHOWA DENKO K.K., Minato-ku, Tokyo (JP)

(72) Inventor: Kazumi Naito, Tokyo (JP)

(73) Assignee: SHOWA DENKO K.K., Tokyo (JP)

(*) Notice: Subject to any disclaimer, the term of this patent is extended or adjusted under 35 U.S.C. 154(b) by 172 days.

(21) Appl. No.: 14/377,361

(22) PCT Filed: Nov. 22, 2012

(86) PCT No.: PCT/JP2012/080313
§ 371 (c)(1),
(2) Date: Aug. 7, 2014

(87) PCT Pub. No.: WO2013/118371
PCT Pub. Date: Aug. 15, 2013

(65) Prior Publication Data
US 2015/0016026 A1    Jan. 15, 2015

(30) Foreign Application Priority Data
Feb. 8, 2012    (JP) ................. 2012-025023

(51) Int. Cl.
| H01G 9/042 | (2006.01) |
| H01G 9/052 | (2006.01) |
| H01G 9/15 | (2006.01) |
| H01G 9/00 | (2006.01) |
| C22C 29/12 | (2006.01) |
| H01G 9/04 | (2006.01) |

(52) U.S. Cl.
CPC ........... *H01G 9/042* (2013.01); *C22C 29/12* (2013.01); *H01G 9/0029* (2013.01); *H01G 9/052* (2013.01); *H01G 9/0525* (2013.01); *H01G 9/15* (2013.01); *H01G 9/0036* (2013.01); *H01G 2009/0404* (2013.01)

(58) Field of Classification Search
CPC ......... H01G 9/155; H01G 9/042; H01G 9/15; H01G 11/32; H01G 11/46; H01G 9/012; H01G 9/052; H01G 9/2027; H01G 11/42; H01G 11/86; H01G 13/00; H01G 2009/0404; H01G 9/0029; H01G 9/025; H01G 9/028; H01G 9/032; H01G 9/0525

See application file for complete search history.

(56) References Cited

U.S. PATENT DOCUMENTS

| 2004/0016978 | A1 | 1/2004 | Yano et al. | |
| 2007/0146969 | A1* | 6/2007 | Naito | H01G 9/012 361/523 |
| 2008/0003503 | A1* | 1/2008 | Kawakami | H01G 9/155 429/231.5 |
| 2012/0137482 | A1* | 6/2012 | Nakamura | H01G 9/0032 29/25.03 |
| 2012/0321911 | A1* | 12/2012 | Watanabe | C01G 51/42 429/5 |

FOREIGN PATENT DOCUMENTS

| JP | 2004-349658 A | | 12/2004 | |
| JP | 2008-291157 A | | 12/2008 | |
| JP | 2010-123494 A | | 6/2010 | |
| JP | 2011-124118 A | | 6/2011 | |
| JP | 2012-204155 | * | 10/2012 | ........ H01M 10/0589 |
| WO | 2007/020464 A1 | | 2/2007 | |

OTHER PUBLICATIONS

International Search Report of PCT/JP2012/080313, dated Dec. 25, 2012. [PCT/ISA/210].

* cited by examiner

*Primary Examiner* — Dion R Ferguson
(74) *Attorney, Agent, or Firm* — Sughrue Mion, PLLC

(57) ABSTRACT

Disclosed is (1) an anode body for capacitors, which is composed of a sintered body containing tungsten dioxide in amount of 80 mass % or more and preferably silicon element in amount of 3.4 mass % or less, (2) a powder as a raw material of the sintered body containing a mixture of tungsten dioxide and silicon element powder in an amount of 80 mass % or more and 3.4 mass % or less, respectively, and which may optionally contain metal tungsten powder, (3) a method for producing an anode body for capacitors, and (4) an electrolytic capacitor which uses the anode body as one electrode and has a dielectric body interposed between the electrode and a counter electrode.

16 Claims, No Drawings

SOLID ELECTROLYTIC CAPACITOR

CROSS REFERENCE TO RELATED APPLICATIONS

This application is a National Stage of International Application No. PCT/JP2012/080313 filed Nov. 22, 2012, claiming priority based on Japanese Patent Application No. 2012-025023, filed Feb. 8, 2012, the contents of all of which are incorporated herein by reference in their entirety.

TECHNICAL FIELD

The present invention relates to a solid electrolytic capacitor having an anode body mainly comprising tungsten dioxide. Specifically, the present invention relates to an anode body for a capacitor made of a sintered body of powder mainly comprising tungsten dioxide; powder as a raw material of the sintered body which contains tungsten dioxide powder in amount of 80 mass % or more and silicon element powder in amount of 3.4 mass % or less; a solid electrolytic capacitor using the anode body; and a production method thereof.

BACKGROUND ART

With the progress of small-size, high-speed and light-weight electronic devices such as cellular phones and personal computers, the capacitor used for these electronic devices is demanded to have a smaller size, a larger capacitance and a lower ESR.

A solid electrolytic capacitor is composed of a conductor (anode body) as one electrode, a dielectric layer formed on the surface of the electrode, and a counter electrode provided thereon (semiconductor layer).

As one such example, it is possible to produce a sintered body from powder mainly comprising tungsten and to produce a solid electrolytic capacitor using the sintered body as an anode, and a small-size and high-capacitance capacitor, which is inexpensive as well, can be obtained. The capacitor can be installed in electronic devices as a microcircuit component.

However, like a conventional solid electrolytic capacitor, the above-mentioned capacitor emits smoke in some cases when the solid electrolytic capacitor shorts out for some external factors and a large current passes through. For these reasons, there has been a demand for a solid electrolytic capacitor which is hard to emit smoke or ignite even if it shorts out and a larger circuit current passes through.

As such a solid electrolytic capacitor which is hard to emit smoke or ignite, a capacitor using niobium monoxide as an anode body has been proposed (International publication WO 2007/020464; Patent Document 1). However, an anode body made of niobium monoxide has a low CV value per volume and it has been difficult to obtain a smaller-size and higher-capacitance capacitor compared to a conventional solid electrolytic capacitor such as a tantalum solid electrolytic capacitor.

PRIOR ART

Patent Document

Patent Document 1: WO 2007/020464

DISCLOSURE OF THE INVENTION

Problems to be Solved by the Invention

An object of the present invention is to provide a small-size and high-capacitance solid electrolytic capacitor which is hard to emit smoke or ignite.

Means to Solve the Problem

The smoke emission of a solid electrolytic capacitor is caused by the combustion of the material used as an anode. Tungsten has a somewhat larger smoke generation current (the amount of current at which smoke emission starts) compared to a material for an anode body such as tantalum and niobium, and is hard to emit smoke. The present inventors have found that a capacitor becomes less subject to fuming and a capacitor having a far larger smoke generation current can be obtained by using conductive tungsten dioxide as a main material of the anode body and have accomplished the present invention.

That is, the present invention relates to the anode body for a capacitor as in 1 to 7 below, powder serving as a raw material of the anode body as in 8 to 11 below, an electrolytic capacitor as in 12, and a method for manufacturing an anode body as in 13 to 16 below.

[1] An anode body for a capacitor containing tungsten dioxide in amount of 80 mass % or more.

[2] The anode body as described in 1 above, containing silicon element in an amount of 3.4 mass % or less.

[3] The anode body as described in 1 or 2 above, containing metal tungsten.

[4] The anode body as described in any one of 1 to 3 above, which is made of a sintered body.

[5] The anode body as described in 4 above, wherein the sintered body has a volume of 30 mm$^3$ or more and contains silicon element in an amount of 1.5 to 3.4 mass %.

[6] The anode body as described in 4 above, wherein the sintered body has a volume of 10 mm$^3$ or more and less than 30 mm$^3$ and contains silicon element in an amount of 1.5 to 2.4 mass %.

[7] The anode body as described in 4 above, wherein the sintered body has a volume of less than 10 mm$^3$ and contains silicon element in an amount of 0.1 to 1.4 mass %.

[8] Powder as being a raw material of the sintered body described in 4 above, containing at least a mixture of tungsten dioxide powder and silicon element powder, wherein the content of the tungsten dioxide powder is 80 mass % or more and the content of the silicon element powder is 3.4 mass % or less.

[9] The powder as described in 8 above, containing metal tungsten powder.

[10] The powder as described in 8 or 9 above, wherein the average particle diameter of the tungsten dioxide powder is 0.1 to 3 μm.

[11] The powder as described in any one of 8 to 10 above, wherein the BET specific surface area of the tungsten dioxide powder is 0.1 to 20 m$^2$/g.

[12] An A solid electrolytic capacitor comprising the anode body described in any one of 1 to 7 as one electrode and a dielectric body interposed between the anode and a counter electrode.

[13] A method for producing an anode body for a capacitor, comprising sintering the raw material powder which contains tungsten dioxide in amount of 80 mass % or more.

[14] The method for producing an anode body as described in 13 above, comprising granulating the raw material powder before sintering the powder.

[15] The method for producing an anode body as described in 13 or 14 above, wherein the raw material powder is obtained by mixing at least tungsten dioxide powder and silicon element powder so that the contents of the tungsten dioxide powder and the silicon element powder in the raw material powder become 80 mass % or more and 3.4 mass % or less, respectively.

[16] The method for producing an anode body as described in 15 above, comprising mixing metal tungsten powder.

Effects of the Invention

An electrolytic capacitor using an anode body containing tungsten dioxide powder in amount of 80 mass % or more of the present invention has a high capacitance, can be produced at low cost, and does not emit smoke even if a large current (for example, a current of about 9 A in a capacitor having a V-size (7.3 mm long, 4.3 mm wide and 1.8 mm high) case) passes through in the event of a short circuit. Also, by incorporating silicon element in an amount of 3.4 mass % or less, chips and cracks of the solid electrolytic capacitor elements decrease, which boosts the yield of the solid electrolytic capacitor products.

Mode for Carrying Out the Invention

Tungsten has a somewhat larger smoke generation current compared to a material such as tantalum and niobium, and is hard to emit smoke. In the present invention, powder containing tungsten dioxide, which is less subject to fuming, as a main component (80 mass % or more) is sintered and used as an anode body.

In the present invention, it is desirable to use as an anode body a sintered body of tungsten dioxide, which facilitates obtaining a larger electrode area. A sintered body of tungsten dioxide can be obtained by sintering tungsten dioxide powder.

Tungsten dioxide powder as produced, or preferably, a granulated powder of tungsten dioxide after being granulated is to be sintered. Note that the tungsten dioxide powder may contain impurities such as metal tungsten which are generated during the process of producing tungsten dioxide powder, in addition to silicon element having effects as described below on the sintered body.

A commercial product can be used as tungsten dioxide powder. In addition, tungsten dioxide powder can be produced by reducing tungsten trioxide powder or ammonium tungstate powder with hydrogen by controlling the hydrogen concentration. If reduction proceeds excessively, metal tungsten powder is generated as a part of the powder.

It is also possible to produce tungsten dioxide by the reduction reaction of tungsten trioxide with tungsten.

In the case of these production methods, the average particle diameter ($D_{50}$) of the tungsten dioxide can be controlled through the concentration of the reducing agent and the like, and is preferably within a range of 0.1 to 3 μm. And powder having a BET specific surface area of 0.1 to 20 $m^2/g$ can be obtained. These average particle diameter and BET specific surface area can be measured by the methods of Examples to be described later.

The anode body of the present invention may contain metal tungsten as long as the content of the tungsten dioxide is 80 mass % or more. Metal tungsten is zero-valent tungsten as well. Examples of a method for producing such an anode body includes a method of producing an anode body by using tungsten dioxide powder without removing metal tungsten partially generated in the powder due to excessive reduction during the production of tungsten dioxide powder; and a method of producing an anode body using a mixed powder of in which metal tungsten powder is mixed in tungsten dioxide powder. Generally, the lower tungsten dioxide content results in a lower smoke generation current, but the smoke generation current does not fall significantly as long as the tungsten dioxide content is 80 mass % or more.

When the tungsten dioxide content is 80 mass % or more, the content ratio of tungsten dioxide, metal tungsten and silicon element in the anode body is generally almost the same as the blending ratio of the tungsten dioxide powder, metal tungsten powder and silicon element powder as raw materials.

In the presence of metal tungsten, silicon element reacts with it at the time of heat treatment for producing granulated powder and a sintered body and tungsten silicide (mainly $W_5Si_3$) is generated on the surface of the granulated powder and the sintered body.

In the present invention, after making a molded body of the powder mainly comprising tungsten dioxide, the molded body is sintered to produce a sintered body. When silicon element is added to the powder mainly comprising tungsten dioxide, it decreases chips and cracks during the molding and enables production of a sintered body having a good shape. Although it is better to increase the silicon element content in order to decrease chips and cracks, when the silicon element content is too high, it tends to degrade the electric performance of the capacitor produced thereof. As a guide, the silicon element content is 3.4 mass % or less, preferably 0.1 to 3.4 mass % to the powder or sintered body mainly comprising tungsten dioxide.

Furthermore, since the optimum content of silicon element depends on the size of the sintered body, the content can be determined by a preliminary experiment. The larger the sintered body becomes, chips and cracks occur more frequently, and therefore it is desirable to add extra silicon element. When the sintered body is small in size, chips and cracks occur infrequently, and therefore it is desirable to add a little less silicon element in preference to electric characteristics of the capacitor. As a result of the measurement of the silicon element content in sintered bodies of various volumes, the silicon content with which chips and cracks rarely occur was 1.5 to 3.4 mass % in a sintered body having a volume of 30 $mm^3$ or more, 0.5 to 2.4 mass % in a sintered body having a volume of 10 $mm^3$ or more and less than 30 $mm^3$, and 0.1 to 1.4 mass % in a sintered body having a volume of less than 10 $mm^3$. Accordingly, the silicon element content is preferably in the above-mentioned range according to the volume of the sintered body.

A solid electrolytic capacitor is formed by comprising the anode body of the present invention as one electrode and a dielectric body interposed between the electrode and a counter electrode (cathode). The dielectric body is formed on the surface (including the surface in the pores) of the anode body by, for example, electrolytically oxidizing an anode body. A counter electrode is formed by, for example, laminating a semiconductor layer such as conductive polymer on the dielectric body.

EXAMPLE

The present invention is described below by referring to Examples and Comparative Examples, but the present invention is not limited thereto.

In the present invention, particle diameter, specific surface area and smoke generation current were measured by the following methods.

Particle Diameter:

The particle diameter was measured using HRA9320-X100 manufactured by Microtrac Inc. and the particle size distribution was measured by the laser diffraction scattering method. A particle size value corresponding to cumulative volume % of 50 volume % ($D_{50}$; μm) was designated as the average particle size.

Specific Surface Area:

The specific surface area was measured by a BET method using NOVA 2000E (manufactured by SYSMEX Corporation).

Smoke Generation Current:

A voltage of 29V from the power source of 1 A at maximum was applied to the produced solid electrolytic capacitor for a maximum of one second to make the capacitor short out completely. Next, voltage from the external power source was applied to the capacitor with 0.5 A increments in each stage, allowing the capacitor to stand in each stage for two minutes, to measure the current at which smoke emission starts. Ten units of capacitors were measured, and the minimum current at which smoke emission starts among the ten units was designated as the smoke generation current.

Example 1

Production of Powder and a Sintered Body

Tungsten dioxide powder having an average particle diameter of 0.7 μm (specific surface area of 3.1 $m^2/g$) was obtained by reducing tungsten trioxide powder at 920° C. under reduced pressure of $10^{-2}$ Pa.

0.5 mass % of commercially available silicon element powder having an average particle size of 1 μm was mixed into the obtained tungsten dioxide powder to be used as a raw material powder.

The raw material powder was allowed to stand at 1,350° C. under reduced pressure of $10^{-2}$ Pa for 20 minutes and returned to room temperature to thereby obtain a massive substance. The massive substance was pulverized with a hammer mill, and particles having a diameter of 20 to 240 μm were sifted out to obtain a granulated powder having an average particle diameter of 120 μm. Using the granulated powder and a lead wire 0.29 mm in diameter and 12 mm in length made of tungsten, a cuboid molded body with a lead wire protruded outside by 8 mm was produced. The molded body was placed in a vacuum heating furnace and sintered at 1,420° C. under reduced pressure of $10^{-2}$ Pa for 30 minutes. The molded body was cooled to room temperature and taken out from the furnace to thereby obtain a tungsten dioxide sintered body having a size of 0.99±0.02×1.51±0.03×4.45±0.06 mm (volume of 6.7 $mm^3$) and mass of 29 mg in which a lead wire was implanted in the face of 0.99×1.51 mm.

[Production of a Solid Electrolytic Capacitor]

A solid electrolytic capacitor was produced as described below using the obtained tungsten dioxide sintered body as an anode body of the capacitor.

The anode was subjected to chemical conversion in a chemical conversion liquid (0.1 mass % of nitric acid aqueous solution) at 10° C., a maximum current of 2 mA/unit, a maximum voltage of 10V for five hours, using a jig recited in Example 1 in WO 2010/107011 publication (US 2012/014036 A1), to form a dielectric layer on the surface thereof.

The anode body having formed a dielectric layer thereon was immersed in 5 mass % of 3,4-ethylenedioxythiophene (hereinafter abbreviated as "EDTH") ethanol solution and dried at room temperature. Next, the anode body was immersed in 10 mass % of iron(III) toluenesulfonate aqueous solution which had been prepared separately and dried at 60° C. for ten minutes after being pulled out of the solution. The operation from immersing the anode body in the above EDTH solution to drying at 60° C. was repeated further four times (five times in total) to thereby obtain a processed body.

Then, a semiconductor layer comprising conductive polymer was formed by electrolytic polymerization as follows.

After immersing the processed body in 20 mass % EDTH ethanol solution, the processed body was immersed in a stainless steel (SUS303) container containing separately prepared electrolytic polymerization liquid (solution of 70 parts by mass of water and 30 parts by mass of ethylene glycol, including 0.4 mass % of EDTH and 0.6 mass % of anthraquinone sulfonic acid) to the depth where the upper surface of the processed body reaches the same level as the liquid level; and electrolytic polymerization was conducted at 20° C., 15 μA for 45 minutes. After taken out from the electrolytic polymerization liquid, the processed body was washed with water, washed with ethanol and dried sequentially. Further, post chemical conversion was conducted in the above-mentioned solution for forming a dielectric layer under conditions of 20° C., maximum voltage of 6.5 V and maximum current of 0.1 mA/unit for 15 minutes, and washing with water, washing with ethanol and drying were conducted sequentially.

The process so far from immersion in 20 mass % EDTH ethanol solution was further repeated six times (seven times in total) to thereby form a semiconductor layer on the dielectric layer. Note that the maximum current at the time of electrolytic polymerization was set to 25 μA for the first time, 35 μA for the second time and 50 μA for the third to seventh time, respectively.

Furthermore, a carbon layer and a silver paste layer were sequentially laminated on the semiconductor layer to form an electrode layer, and a solid electrolytic capacitor element was fabricated.

Pairs of two solid electrolytic capacitor elements were placed in the same direction on a 100-μm-thick lead frame having tin plating on the surface. When the capacitor elements were placed on the lead frame, lead wires have been cut to a certain length to fit the lead frame. Also, the capacitor elements were placed so that the 1.51×4.45 mm surface of the sintered body faces to the lead frame.

The lead wire of the element placed on the lead frame was connected by resistance welding and the electrode layer of the element was connected by solidifying the silver paste layer, electrically and mechanically, to an anode lead and a cathode lead of the lead frame, respectively.

The lead frame to which the elements were connected was sealed by transfer molding using resin according to an ordinary method, followed by aging, cut at a predetermined position and subjected to bending process, to thereby produce 64 units of a chip-shape tungsten dioxide solid electrolytic capacitor in a size of 7.3×4.3×1.9 mm having a rated voltage of 2.5 V. As the sealing resin in the transfer molding, CV3400SE resin manufactured by Matsushita Electric Works Co., Ltd. (present name: Panasonic Electric Works Co., Ltd.) was used.

Examples 2 to 6, Comparative Examples 1 to 2

Solid electrolytic capacitors in Examples 2 to 6 and Comparative Examples 1 to 2 were produced in the same way as in Example 1 except that a raw material powder was used, which was obtained by blending 0.5 mass % of silicon element powder in the same way as in Example 1 into a mixed power of tungsten dioxide powder, which had been produced in the same way as in Example 1, and a commercially available tungsten powder having an average particle diameter of 0.5 μm. The blending ratio of the tungsten powder was adjusted so that the tungsten dioxide content (mass %) in the raw material powder reaches the values shown in Table 1. The mass of the sintered body was found to be 29 mg in Examples 2 to 6 and 38 mg in Comparative Examples 1 to 2.

Examples 7 to 11

Solid electrolytic capacitors in Examples 7 to 11 were produced in the same way as in Example 1 to 4 and 6, except that silicon element was not added when a raw material powder was prepared. The mass of the sintered body was found to be 29 mg in all of the examples.

Comparative Example 3

A chip-shape tungsten solid electrolytic capacitor was obtained in the same way as in Example 1 except that tungsten powder having an average particle diameter of 0.7 μm obtained by completely reducing ammonium tungstate with hydrogen was used instead of tungsten dioxide powder in Example 1 and the temperature for obtaining a massive substance and a sintered body was set to 1,380° C. and 1,520° C., respectively. The mass of the sintered body was found to be 58 mg.

Comparative Example 4

A chip-shape tungsten solid electrolytic capacitor was obtained in the same way as in Comparative Example 3 except that silicon element powder in Comparative Example 3 to obtain a massive substance was not blended. The mass of the sintered body was found to be 58 mg.

Comparative Example 5

A chip-shape tungsten solid electrolytic capacitor was obtained in the same way as in Comparative Example 3 except that the sintering temperature and the mass of the sintered body were changed to 1,380° C. and 33 mg, respectively.

Comparative Example 6

A chip-shape tantalum solid electrolytic capacitor was obtained in the same way as in Example 1 except that a granulated powder (without the addition of silicon element) of the tantalum powder having an average particle diameter of 0.7 μm obtained by reducing potassium fluorotantalate with sodium was used instead of tungsten dioxide powder in Example 1 and the sintering temperature was set to 1,390° C. The mass of the sintered body was found to be 40 mg.

The capacitance and the smoke generation current of the solid electrolytic capacitors produced in each of the examples were measured. The capacitance was measured by applying a direct-current voltage of 2.5 V at room temperature and 120 Hz using the LCR meter manufactured by Agilent Technologies, Inc.

The results of Examples 1 to 11 and Comparative Examples 1 to 6 are shown in Table 1.

TABLE 1

| | Tungsten dioxide content (mass %) | Capacitance (μF) | Smoke generation current (A) |
|---|---|---|---|
| Example 1 | 99.5 | 480 | 10 |
| Example 2 | 98 | 484 | 10 |
| Example 3 | 95 | 502 | 10 |
| Example 4 | 90 | 511 | 9 |
| Example 5 | 85 | 518 | 9 |
| Example 6 | 80 | 526 | 8.5 |
| Example 7 | 100 | 488 | 10 |
| Example 8 | 98 | 496 | 10 |
| Example 9 | 95 | 494 | 10 |
| Example 10 | 90 | 506 | 9 |
| Example 11 | 80 | 528 | 8.5 |
| Comparative Example 1 | 75 | 628 | 4 |
| Comparative Example 2 | 65 | 660 | 4 |
| Comparative Example 3 | 0 | 720 | 4 |
| Comparative Example 4 | 0 | 740 | 4 |
| Comparative Example 5 | 0 | 400 | 4 |
| Comparative Example 6 | 0 | 420 | 3 |

The following can be seen from Table 1.
(1) Relationship between the tungsten dioxide ratio and the smoke generation current:

When the tungsten dioxide ratio is 80 mass % or more, the smoke generation current is 8.5 A or higher in both cases where the raw material powder contains 0.5 mass % of silicon element (Examples 1 to 6) and where the raw material powder does not contain silicon element (Examples 7 to 11). The value is remarkably larger compared to the smoke generation current of 4 A in the case of using tungsten only (Comparative Example 3). When the tungsten dioxide ratio is 75 mass % or less (Comparative Examples 1 to 2), the value is comparable to the cases where the raw material powder contains metal tungsten only (Comparative Example 4) or where metal tungsten contains 0.5 mass % of silicon element (Comparative Example 3).

(2) Relationship between the metal tungsten ratio and the capacitance of a capacitor:

As the metal tungsten ratio increases from 0 mass % (Example 7) to 100 mass % (Comparative Examples 3 and 4), the capacitance of a capacitor increases from a level of 480 μF to a level of 740 μF regardless of whether metal tungsten contains silicon element or not. However, as mentioned in above (1), the smoke generation current markedly decreases in the case where the tungsten dioxide ratio is 75 mass % or less (Comparative Examples 1, 2 and the like). Therefore, to obtain a larger capacitance insofar as a large smoke generation current can be attained (i.e. within a range such that the tungsten dioxide content is 80 mass % or more), it is desirable to adjust the metal tungsten content in the raw material powder or anode body to 2 mass % or more, more preferably to 10 mass % or more.

(3) Other matters:

The solid electrolytic capacitor using the capacitor anode containing tungsten dioxide in amount of 80 mass % or more of the present invention has a larger capacitance than the tantalum capacitor of the same size (Comparative Example 6) and a significantly higher smoke generation current. Therefore, smoke emission of the capacitor is highly improbable even if a large current flows through it.

The number of chips and cracks in the sintered bodies of Examples 1 to 3 and 7 to 9 are shown in Table 2. The "unit %"

in each example indicates the ratio of the number of the sintered bodies in which two or more of chips and cracks of at least 0.1 mm in length in six surfaces of the sintered body were observed under a magnifying glass among 100 units of the sintered bodies. A chip or crack bridging over two or more surfaces was counted as one. As can be seen from Table 2, when the capacitor has a volume of 10 mm³ or less, the number of solid electrolytic capacitors having chips and cracks remarkably decreases by adding silicon element to tungsten dioxide, which improves the yield rate of the solid electrolytic capacitor products.

TABLE 2

|  | Number of Units (%) |
|---|---|
| Example 1 | 10 |
| Example 2 | 10 |
| Example 3 | 13 |
| Example 7 | 20 |
| Example 8 | 23 |
| Example 9 | 20 |

The invention claimed is:

1. An anode body for a capacitor containing tungsten dioxide in amount of 80 mass % or more.

2. The anode body as claimed in claim 1, containing silicon element in an amount of 3.4 mass % or less.

3. The anode body as claimed in claim 1, containing metal tungsten.

4. The anode body as claimed in claim 1, which is made of a sintered body.

5. The anode body as claimed in claim 4, wherein the sintered body has a volume of 30 mm³ or more and contains silicon element in an amount of 1.5 to 3.4 mass %.

6. The anode body as claimed in claim 4, wherein the sintered body has a volume of 10 mm³ or more and less than 30 mm³ and contains silicon element in an amount of 1.5 to 2.4 mass %.

7. The anode body as claimed in claim 4, wherein the sintered body has a volume of less than 10 mm³ and contains silicon element in an amount of 0.1 to 1.4 mass %.

8. Powder as being a raw material of the sintered body claimed in claim 4, containing at least a mixture of tungsten dioxide powder and silicon element powder, wherein the content of the tungsten dioxide powder is 80 mass % or more and the content of the silicon element powder is 3.4 mass % or less.

9. The powder as claimed in claim 8, containing metal tungsten powder.

10. The powder as claimed in claim 8, wherein the average particle diameter of the tungsten dioxide powder is 0.1 to 3 µm.

11. The powder as claimed in claim 8, wherein the BET specific surface area of the tungsten dioxide powder is 0.1 to 20 m²/g.

12. A solid electrolytic capacitor comprising the anode body claimed in claim 1 as one electrode and a dielectric body interposed between the anode and a counter electrode.

13. A method for producing an anode body for a capacitor, comprising sintering the raw material powder which contains tungsten dioxide in amount of 80 mass % or more.

14. The method for producing an anode body as claimed in claim 13, comprising granulating the raw material powder before sintering the powder.

15. The method for producing an anode body as claimed in claim 13, wherein the raw material powder is obtained by mixing at least tungsten dioxide powder and silicon element powder so that the contents of the tungsten dioxide powder and the silicon element powder in the raw material powder become 80 mass % or more and 3.4 mass % or less, respectively.

16. The method for producing an anode body as claimed in claim 15, comprising mixing metal tungsten powder.

* * * * *